United States Patent [19]
Mercado

[11] Patent Number: 4,681,407
[45] Date of Patent: Jul. 21, 1987

[54] TWO-GLASS PHOTOGRAPHIC OBJECTIVE COLOR-CORRECTED AT FOUR WAVELENGTHS

[75] Inventor: Romeo I. Mercado, San Jose, Calif.

[73] Assignee: Lockheed Missiles & Space Company, Inc., Sunnyvale, Calif.

[21] Appl. No.: 803,173

[22] Filed: Dec. 2, 1985

[51] Int. Cl.⁴ .................................................. G02B 9/36
[52] U.S. Cl. ...................................... 350/471; 350/464
[58] Field of Search ............... 350/471, 464, 469, 470, 350/450

[56] References Cited
U.S. PATENT DOCUMENTS 3,395,962  8/1968  Herzberger et al. ................ 350/464
4,400,065  8/1983  Nagler ................................... 350/450

OTHER PUBLICATIONS

Mercado et al, Superachromatic Petzval Objectives with Glasses Selected Using Buchdahls' Chromatic Coordinate, 10-19-1982, J.O.S.A. vol. 72, p. 1725.

Primary Examiner—John K. Corbin
Assistant Examiner—P. M. Dzierzynski
Attorney, Agent, or Firm—John J. Morrissey

[57] ABSTRACT

A photographic objective comprising six lens elements is well-corrected for both monochromatic and chromatic aberrations, and is color-corrected at four wavelengths in a band extending from the visible to the near infrared regions of the electromagnetic spectrum with only negligible secondary and high-order spectra at wavelength between those for which color correction is achieved. The design form for the objective has been optimized for a focal length of 200 mm at an aperture ratio of f/4 and a field of view of 12° without vignetting.

6 Claims, 5 Drawing Figures

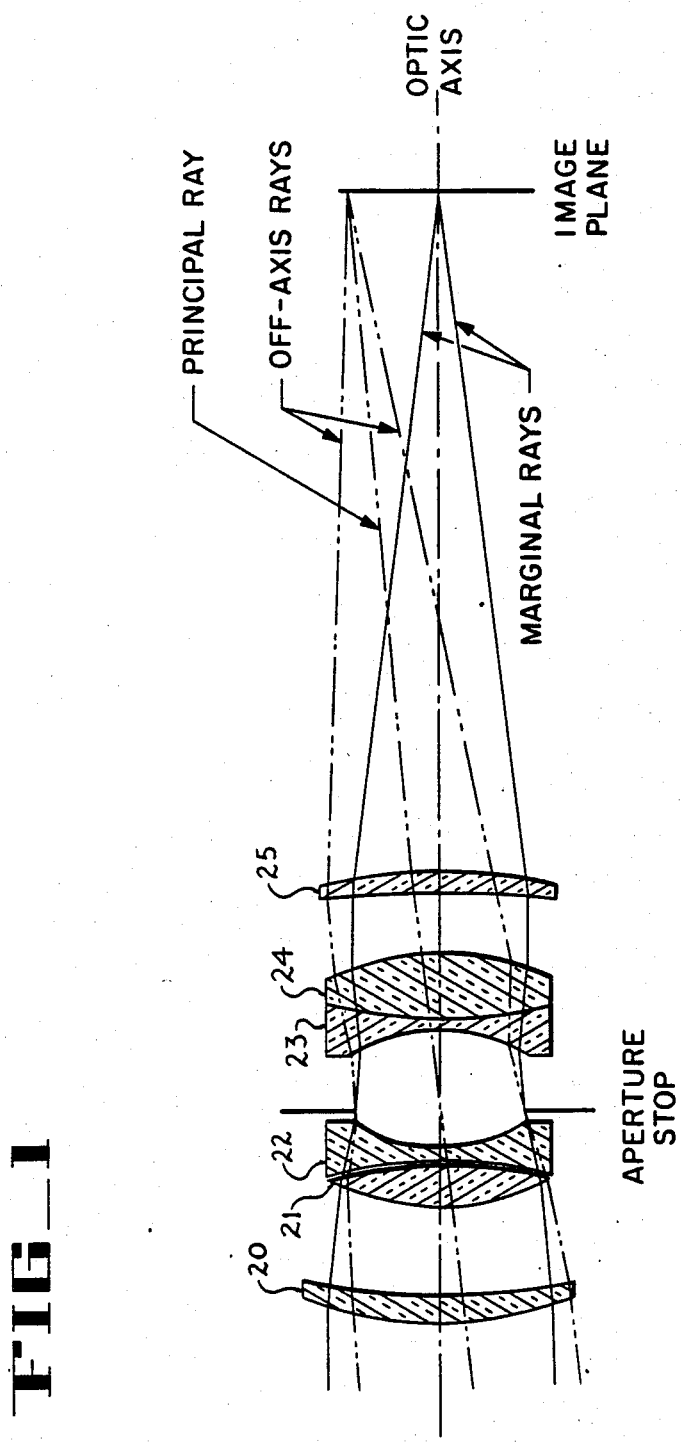
FIG_1

FIG_2
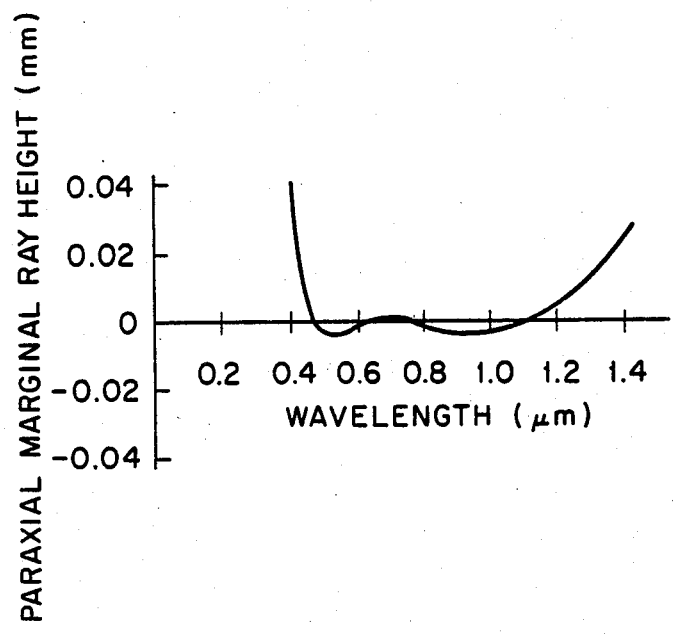
FIG_3
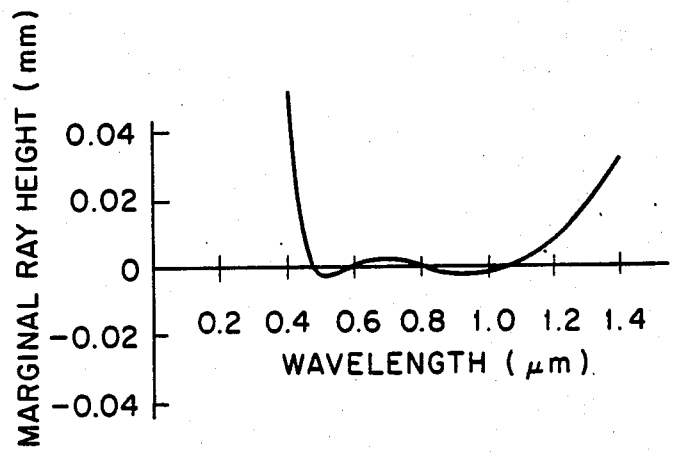

FIG_4
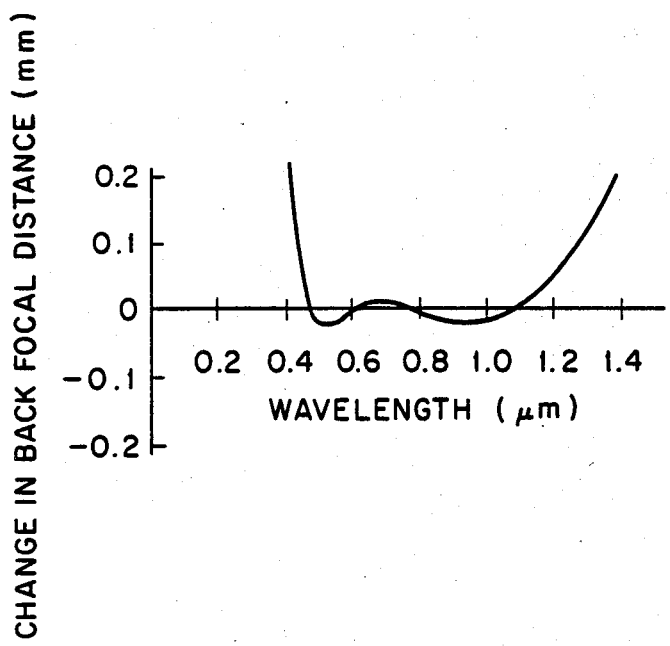
FIG_5
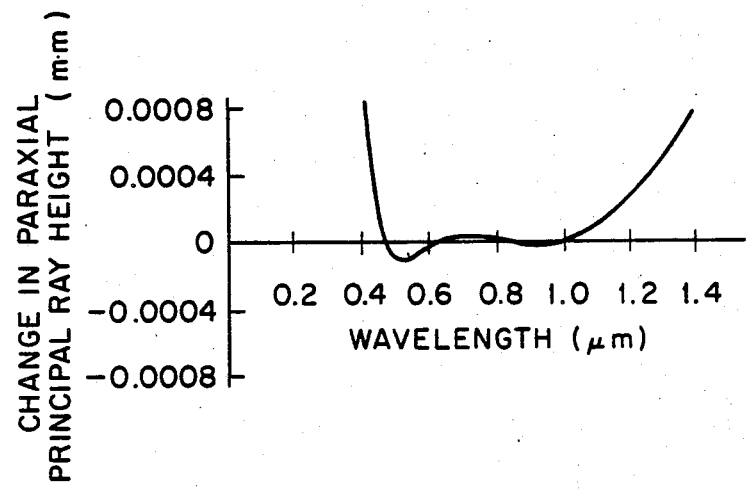

TWO-GLASS PHOTOGRAPHIC OBJECTIVE COLOR-CORRECTED AT FOUR WAVELENGTHS

TECHNICAL FIELD

This invention relates generally to optical objectives, and more particularly to a well-corrected, moderately high-resolution, two-glass photographic objective that is color-corrected at more than two wavelengths over a spectral band extending from the visible to the near infrared regions of the electromagnetic spectrum.

BACKGROUND OF THE INVENTION

Commercially available photographic objectives are generally color-corrected at only two wavelengths (i.e., bring only two wavelengths to a common focus) in a relatively narrow spectral range typically only in the visible region of the electromagnetic spectrum.

SUMMARY OF THE INVENTION

The present invention provides a two-glass optical objective (i.e., an optical objective made of only two different optical glasses), which is well-corrected both for monochromatic and for chromatic aberrations. In particular, an optical objective according to the present invention is color-corrected at four wavelengths in a wide band extending from the visible to the near infrared regions of the electromagnetic spectrum.

The preferred embodiment of the present invention disclosed herein comprises six lens elements, viz:

(1) a positive meniscus lens made of Hoya ADC1 glass,
(2) a biconvex lens made of Hoya ADC1 glass,
(3) a biconcave lens made of Hoya SBF1 glass,
(4) a biconcave lens made of Hoya SBF1 glass,
(5) a biconvex lens made of Hoya ADC1 glass, and
(6) a positive meniscus lens made of Hoya ADC1 glass, disposed sequentially along an optic axis, with the individual lens elements being rotationally symmetric about the optic axis.

DESCRIPTION OF THE DRAWING

FIG. 1 is a profile drawing of an optical objective according to the present invention.

FIG. 2 is a plot of paraxial marginal ray height versus wavelength for the objective of FIG. 1.

FIG. 3 is a plot of marginal ray height versus wavelength for the objective of FIG. 1.

FIG. 4 is a plot of change in back focal distance versus wavelength for the objective of FIG. 1.

FIG. 5 is a plot of change in paraxial principal ray height versus wavelength for the objective of FIG. 1.

BEST MODE OF CARRYING OUT THE INVENTION

An optical objective according to the present invention is schematically illustrated in FIG. 1 for a 200 mm focal length at a relative aperture of f/4 over a 12° field of view without vignetting. The objective shown in FIG. 1 has a design form that provides substantially diffraction-limited performance over a spectral band extending from visible to infrared wavelengths, and which is color-corrected at four wavelengths in that band, as discussed hereinafter in connection with FIGS. 2-5.

The design parameters for the specific optical objective shown in FIG. 1 could be scaled up or down from the 200 mm focal length and f/4 relative aperture (or "aperture ratio") to different focal lengths, depending upon the requirements of particular applications. In general, aberrations are scaled up or down in proportion to focal length. The objective shown in FIG. 1 is an example of an optical objective whose design parameters provide optimal performance for a focal length of 200 mm and a field of view of 12° without vignetting. For focal lengths shorter than 200 mm, aberrations would be correspondingly decreased. In applications that permit vignetting, the design form for the objective shown in FIG. 1 could readily be optimized to achieve color-correction at substantially the same wavelengths over a wider field of view than 12°.

The optical objective of FIG. 1 comprises two groups of lens elements separated by an aperture stop. The lens elements of the two groups are arranged along an optic axis so that each lens element is rotationally symmetric with respect to the optic axis. Each group comprises three lens elements, viz., a positive meniscus lens, a biconvex lens and a biconcave lens. Both surfaces of each lens element are spherical, which facilitates manufacturability and minimizes production cost. The three lens elements of one group are arranged in inverse sequential order with respect to the three lens elements of the other group along the optic axis. Only two different kinds of optical glasses are used. In the preferred embodiment, the glasses used are Hoya ADC1 glass and Hoya SBF1 glass manufactured by Hoya Corporation of Tokyo, Japan. However, it has been found that color correction at four wavelengths in the same spectral range can also be achieved, if the Hoya SBF1 glass is replaced by Hoya ZNC5 glass, Hoya CF6 glass, Schott KF9 glass or Schott KF6 glass (where the Schott glasses are available from Schott Optical Glass Inc. of Duryea, Pennsylvania). In an alternative embodiment in which Hoya ZNC5 glass, Hoya CF6 glass, Schott KF9 glass or Schott KF6 glass is used instead of Hoya SBF1 glass, the design form of the objective must be re-optimized but has generally the same configuration as shown in FIG. 1.

The design form for the optical objective of FIG. 1 is referred to a base wavelength of $\lambda_0 = 0.58756$ micron (i.e., the yellow helium d line), and is specified in tabular format as follows:

TABLE I

| Surface No. | Radius (mm) | Thickness (mm) | $N_d$ | $V_d$ | Material |
|---|---|---|---|---|---|
| 1 | 88.077 | 6.000 | 1.62000 | 62.19 | ADC1 |
| 2 | 151.660 | 20.109 | | | Air |
| 3 | 52.142 | 10.089 | 1.62000 | 62.19 | ADC1 |
| 4 | −113.415 | 0.281 | | | Air |
| 5 | −111.061 | 3.507 | 1.55115 | 49.52 | SBF1 |
| 6 | 37.670 | 8.522 | | | Air |
| 7 | Aperture stop | 18.347 | | | Air |
| 8 | −40.751 | 2.658 | 1.55115 | 49.52 | SBF1 |
| 9 | 98.518 | 0.000 | | | [Cemented] |
| 10 | 98.518 | 14.955 | 1.62000 | 62.19 | ADC1 |
| 11 | −59.425 | 13.482 | | | Air |
| 12 | −395.681 | 5.000 | 1.62000 | 62.19 | ADC1 |
| 13 | −108.015 | 151.100 | | | Air |
| 14 | Image plane | | | | | where the surfaces of the lens elements and the other optically significant surfaces are numbered consecutively from left to right in accordance with conventional optical design practice.

The radius listed in the second column of Table I for each surface is the radius of curvature of the particular surface expressed in millimeters. In accordance with convention, the radius of curvature of an optical surface is said to be positive if the center of curvature of the surface lies to the right of the surface, and negative if the center of curvature of the surface lies to the left of the surface. The thickness listed in the third column of Table I for each surface is the thickness of the lens element, or of the spacing, bounded on the left by the particular surface. Thickness is expressed in millimeters, and is measured along the optic axis of the objective. The heading $N_d$ in the fourth column of Table I indicates the refractive index of the lens element bounded on the left by the indicated surface, where the value of the refractive index is given for the yellow helium d line. The heading $V_d$ in the fifth column of Table I indicates the Abbe number for the particular lens element at the same base wavelength. The "material" listed in the sixth column of Table I for each surface refers to the type of optical material (i.e., the type of glass) used for making the lens element bounded on the left by the indicated surface.

As illustrated in FIG. 1, the preferred embodiment of the optical objective of the present invention comprises a first group of lens elements (viz., a positive meniscus lens 20, a biconvex lens 21 and a biconcave lens 22) and a second group of lens elements (viz., a biconcave lens 23, a biconvex lens 24 and a positive meniscus lens 25) disposed coaxially with respect to each other along the optic axis. The first and second groups are separated by an aperture stop. It is important for the position of the aperture stop to be specified in any patent describing an optical system, since most aberrations are functions of the aperture stop position.

The surfaces of the lens elements, and also the positions of the aperture stop and the image plane, of the optical objective shown in FIG. 1 are listed in consecutive order (from left to right along the optic axis) in Table I. The surfaces No. 1 and No. 2 listed in Table I are the surfaces of the lens element 20, which is made of Hoya ADC1 glass. The surfaces No. 3 and No. 4 are the surfaces of the lens element 21, which is likewise made of Hoya ADC1 glass, and which is separated from the lens element 20 by an air gap of 20.109 mm measured along the optic axis. The surfaces No. 5 and No. 6 are the surfaces of the lens element 22, which is made of Hoya SBF1 glass. The lens element 22 is separated from the lens element 21 by a small air gap of 0.281 mm measured along the optic axis.

The surface No. 7 indicates the aperture stop for the optical objective shown in FIG. 1, and is located 8.522 mm from the lens element 22 along the optic axis.

The surfaces No. 8 and No. 9 listed in Table I are the surfaces of the lens element 23, which is made of Hoya SBF1 glass, and which is located 18.347 mm from the aperture stop along the optic axis. The surfaces No. 10 and No. 11 are the surfaces of the lens element 24, which is made of Hoya ADC1 glass, and which is cemented to the lens element 23. The surfaces No. 12 and No. 13 are the surfaces of the lens element 25, which is made of Hoya ADC1 glass, and which is separated by 13.482 mm from the lens element 24 along the optic axis.

The lens elements 20, 21, 22, 23, 24 and 25 form a dioptric system having a focal plane (or image plane) listed as surface No. 14 which is located at a distance 151.100 mm from the lens element along the optic axis. The distance from the surface No. 13 to surface No. 14 is called the back focal distance of the system.

The index of refraction $N_d$ for each lens element is an experimentally determined value as determined by the glass manufacturer, Hoya Corporation, for the wavelength $\lambda_0 = 0.58756$ micron. The Abbe number $V_d$ for each lens element is the ratio $(N_d - 1)/(N_F - N_C)$, where $N_F$ is the refractive index of the particular glass at the hydrogen F line (i.e., at 0.48613 micron) and $N_C$ is the refractive index of the particular glass at the hydrogen C line (i.e., at 0.65627 micron). The values of $N_d$ and $V_d$ listed in Table I for a particular surface refer to the lens element shown to the right of the indicated surface in FIG. 1. The optical material from which each lens element is made is technically specified in terms of the index of refraction $N_d$ and the Abbe number $V_d$. However, as a practical matter, optical designers ordinarily specify an optical glass in terms of the manufacturer's name and catalog number.

For an optical objective requiring a different focal length and/or a different aperture ratio, a practicing optical designer skilled in the art, starting with the design parameters listed in Table I for the objective shown in FIG. 1, could apply his craft in a straightforward way to re-optimize the design form of FIG. 1 so as to achieve optimal correction of monochromatic and chromatic aberrations for the particular focal length, aperture ratio and field of view required.

It is not apparent a priori that Hoya ZNC5 glass, or Hoya CF6 glass, or Schott KF9 glass, or Schott KF6 glass could be substituted for Hoya SBF1 glass in the lens elements 22 and 23 of the design form of FIG. 1 and still permit color correction to be obtained at four wavelengths in the same wide spectral band. However, a practicing optical designer skilled in the art, having been informed of the suitability of Hoya ZNC5, Hoya CF6, Schott KF9 and Schott KF6 glasses as substitutes for Hoya SBF1 glass in the design form of FIG. 1, who starts with the design parameters listed in Table I above and with the values of $N_d$ and $V_d$ for the substitute glasses as listed in Table II below, should without undue effort be able to re-optimize the design form of FIG. 1 so as to achieve optimal correction of both monochromatic and chromatic aberrations. The values of index of refraction $N_d$ and Abbe number $V_d$ for the substitute glasses at the base wavelength $\lambda_0 = 0.58756$ micron are as follows:

TABLE II

| Glass | $N_d$ | $V_d$ |
| --- | --- | --- |
| Hoya ZNC5 | 1.53375 | 55.38 |
| Hoya CF6 | 1.51742 | 52.15 |
| Schott KF9 | 1.52341 | 51.49 |
| Schott KF6 | 1.51742 | 52.20 |

It is a feature of the embodiment of the invention illustrated in FIG. 1 that a well-corrected image can be obtained for a field angle of up to 12° without vignetting, for a focal length of 200 mm and an aperture ratio of f/4, with color correction occurring at four distinct wavelengths, and with only insignificant secondary and higher-order spectra (also called "secondary color", "tertiary color," and "quarternary color") occurring at the wavelengths between those for which color correction is achieved. Incident light of four colors that are widely separated from each other in a spectral band extending from visible to near infrared wavelengths is brought to a focus at a common point by the optical objective of FIG. 1.

A measure of the extent to which secondary and higher-order spectra have been minimized for the optical objective illustrated in FIG. 1 is indicated by the plot of paraxial marginal ray height versus wavelength shown in FIG. 2. A paraxial marginal ray passing through an optical system is a ray that originates at an object point on the optic axis of the system and passes through the system in the immediate vicinity of the optic axis. When the object point is infinitely distant from the entrance pupil of the system, a paraxial marginal ray for any particular wavelength enters the system parallel to the optic axis and is refracted by the components of the system to form an image at a paraxial focal surface of the system for that wavelength. The point at which the paraxial marginal ray for the given wavelength intersects the optic axis of the system defines the paraxial focal point of the system for that wavelength. A surface perpendicular to the optic axis and passing through the paraxial focal point for the given wavelength defines the paraxial focal surface of the system for that wavelength. The location of the paraxial focal point (and therefore the location of the paraxial focal surface) generally varies with wavelength; and this variation is called the chromatic variation of focus, or the axial chromatic aberration, or the longitudinal chromatic aberration.

In general, a paraxial marginal ray from an infinitely distant object point intersects the paraxial focal surface of an optical system for a particular wavelength at a point that is spatially separated from the point of intersection of the optic axis of the system with that paraxial focal surface. The lateral distance defining the separation between the point of intersection of a paraxial marginal ray with a surface and the point of intersection of that surface with the optic axis of the system is called the paraxial marginal ray "height" of the system at that surface.

In general, the value of the paraxial marginal ray height at a given focal surface of an imaging system changes with wavelength due to axial chromatic aberration. A point object cannot generally be imaged as a point (even using only monochromatic light), but instead is generally imaged as a blur due to monochromatic aberrations and diffraction effects. If polychromatic light (or a continuous spectrum of white light) is used, the resulting image blur has a component due to monochromatic aberrations and a component due to chromatic aberrations, even when diffraction effects are ignored.

The value of the paraxial marginal ray height at a given focal surface for an imaging system at any particular wavelength is a measure of the extent of the geometrical image blur (i.e., the image blur without consideration of diffraction effects) inherent in the system at that particular wavelength. The variation of paraxial marginal ray height with wavelength at a given focal surface provides an indication of the extent to which axial chromatic aberration is corrected in the system.

For the optical objective of the present invention, the curve in FIG. 2 illustrating the variation of paraxial marginal ray height with respect to wavelength indicates that chromatic aberration is precisely corrected (i.e., color correction is achieved) at four wavelengths (as indicated by the four crossings of the wavelength axis by the curve) in a wavelength band extending from the visible to the near infrared regions of the optical spectrum. Furthermore, the curve in FIG. 2 is close to the wavelength axis (i.e., paraxial marginal ray height is quite small) for all wavelengths between those for which color correction is achieved.

The ordinate of the curve representing paraxial marginal ray height versus wavelength at a given focal surface is a measure of the radius of the geometrical blur for that particular wavelength at that focal surface. For an optical system that is color-corrected at only two wavelengths, the curve for paraxial marginal ray height would cross the horizontal (i.e., wavelength) axis at only two points corresponding to the two wavelengths for which color correction has been achieved, and the "height" of the curve for a particular wavelength above or below the horizontal axis between the two crossing points is a measure of the radius of the geometrical image blur for that particular wavelength at the focal surface. The maximum "height" of the curve representing paraxial marginal ray height versus wavelength for a system that is color-corrected at only two wavelengths is called the "secondary spectrum" of the system.

For an optical system that is color-corrected at three wavelengths, the curve representing paraxial marginal ray height versus wavelength would cross the horizontal axis at three points. The maximum "height" of the curve in the wavelength band between the highest-wavelength and lowest-wavelength crossings of the horizontal axis is a measure of the maximum radius of the geometrical image blur, and indicates the secondary and tertiary spectra of the system. For an optical system that is color-corrected at four wavelengths, such as the optical objective of the present invention, the curve representing paraxial marginal ray height versus wavelength crosses the horizontal axis at four points. The maximum "height" of the curve in the wavelength band between the highest-wavelength and lowest-wavelength crossings of the horizontal axis is a measure of the maximum radius of the geometrical image blur, and indicates the secondary, tertiary and quarternary spectra of the system. From FIG. 2, it is apparent that the optical objective of the present invention has practically insignificant secondary and higher order spectra at the wavelengths between those for which color correction is achieved.

In FIG. 3, marginal ray height versus wavelength is plotted for the optical objective of the present invention. A marginal ray passing through an optical system is a ray that originates at an axial object point and grazes the periphery of the entrance pupil of the system so as to define the maximum cone of rays from that object point that can be accepted by the system. For an infinitely distant object, the marginal ray is parallel to the optic axis and has a ray height from the optic axis equal to the radius of the entrance pupil of the system.

The parameters (i.e., ray heights and slopes) of a marginal ray passing through an optical system can be calculated by application of Snell's Law. As with a paraxial marginal ray, so also a marginal ray intersects a focal surface of the system at a point that generally is spatially separated from the point of intersection of the optic axis with the focal surface. The lateral separation between the optic axis of the system and the point of intersection of the marginal ray with a surface is designated as the marginal ray "height" for that surface. The value of the marginal ray height at a given focal surface changes with wavelength due to spherical aberration and the chromatic variation of spherical aberration (i.e., spherochromatism) inherent in the system. The value of the marginal ray height for a particular wavelength is a measure of the extent of geometric image blur at the particular wavelength, taking spherical aberration into consideration. As indicated by the curve of FIG. 3, the optical objective of the present invention is extremely well-corrected for spherical aberration in addition to being color-corrected at four wavelengths.

In FIG. 4, change in back focal distance is plotted as a function of wavelength for the optical objective of the present invention. The back focal distance of the imaging system of FIG. 1 for a particular wavelength is the distance along the optic axis between the focal surface for that particular wavelength and the last refractive surface of the system.

For a color-corrected imaging system, paraxial marginal rays at the wavelengths for which color correction has been achieved are brought to a common focus. The back focal distance for those wavelengths for which color correction has been achieved can be considered as a "baseline" back focal distance. For the wavelengths at which color correction has not been achieved (i.e., for the wavelengths between the crossing points on the horizontal axis for the curve of FIG. 2), the paraxial marginal rays are focussed at other focal surfaces whose positions along the optic axis of the imaging system are dependent upon wavelength. The variation with wavelength of the change in back focal distance from the "baseline" back focal distance, as shown by the curve in FIG. 4, provides an indication of the chromatic variation in focal position along the optic axis of the system, and hence is commonly called "longitudinal" or "axial" chromatic aberration. The curve of FIG. 4 provides a measure of the axial chromatic aberration of the optical objective of the present invention, and indicates that the optical objective is well-corrected for axial chromatic aberration.

A paraxial principal ray passing through an optical system is a paraxial ray that originates at an extremity of an extended object and passes through the center of the entrance pupil of the system. A paraxial principal ray (also called a chief ray) for a particular wavelength intersects a focal surface of the system at a point that is spatially separated from the point of intersection of the optic axis with the focal surface. The lateral distance from the optic axis of the system to the point of intersection of the paraxial principal ray with a surface is called the paraxial principal ray "height" for that surface. If that surface is a focal surface, the paraxial principal ray height at that surface corresponds to the geometrical image height for that wavelength.

The value of the paraxial principal ray height at a given focal surface for an imaging system changes with wavelength. For a color-corrected imaging system, the paraxial principal ray height at the focal surface for which color-correction has been achieved can be considered as a "baseline" paraxial principal ray height. In FIG. 5, change in paraxial principal ray height is plotted as a function of wavelength for the optical objective of the present invention. The variation with wavelength of the change in the value of the paraxial principal ray height from the "baseline" paraxial principal ray height provides a measure of the chromatic variation of image height, which is commonly called the chromatic difference of magnification, or lateral chromatic aberration, or "lateral color". It is noted that the scales of the ordinate axes in FIGS. 4 and 5 are different from each other, and are different from the scale of the ordinate axes in FIGS. 2 and 3.

This invention has been described above in terms of a particular embodiment that was designed using a particular pair of commercially available optical glasses, which enable color correction to be achieved at four wavelengths. The detailed optical prescription for the embodiment shown herein has been optimized for a particular focal length, a particular aperture ratio and a particular field of view, and is intended to be merely descriptive of the invention. The invention is defined more generally by the following claims and their equivalents.

I claim:

1. An optical objective comprising six lens elements positioned coaxially with respect to each other along an optic axis, said six lens elements being made from only two different optical materials, at least one of said lens elements being made from a first one of said optical materials, at least one other of said lens elements being made from a second one of said optical materials, said lens elements coacting with each other so that paraxial marginal rays passing through said objective are brought to a common focus on a common focus on said optic axis at four discrete wavelengths.

2. The optical objective of claim 1 wherein said first one of said two different optical materials has an index of refraction of approximately 1.620 and an Abbe number of approximately 62.19 at a base wavelength of 0.58756 micron, and said second one of said two different optical materials has an index of refraction of approximately 1.551 and Abbe number of approximately 49.52 at said base wavelength.

3. The optical objective of claim 2 wherein said first optical material is Hoya ADC1 optical glass, and said second optical material is Hoya SBF1 optical glass.

4. The optical objective of claim 2 having a design form optimized for a focal length of 200 millimeters at a relative aperture of f/4 and a field of view of 12° as follows:

| Surface No. | Radius (mm) | Thickness (mm) | Material |
| --- | --- | --- | --- |
| 1 | 88.077 | 6.000 | ADC1 |
| 2 | 151.660 | 20.109 | Air |
| 3 | 52.142 | 10.089 | ADC1 |
| 4 | −113.415 | .281 | Air |
| 5 | −111.061 | 3.507 | SBF1 |
| 6 | 37.670 | 8.522 | Air |
| 7 | Aperture Stop | 18.347 | Air |
| 8 | −40.751 | 2.658 | SBF1 |
| 9 | 98.518 | 0.000 | [Cemented] |
| 10 | 98.518 | 14.955 | ADC1 |
| 11 | −59.425 | 13.482 | Air |
| 12 | −395.681 | 5.000 | ADC1 |
| 13 | −108.015 | 151.100 | Air |
| 14 | Image Plane | | | where surfaces No. 1 and No. 2 are the surfaces of a first one of said lens elements, surfaces No. 3 and No. 4 are the surfaces of a second one of said lens elements, surfaces No. 5 and No. 6 are the surfaces of a third one of said lens elements, surface No. 7 indicates an aperture stop for said objective, surfaces No. 8 and No. 9 are the surfaces of a fourth one of said lens elements, surfaces No. 10 and No. 11 are the surfaces of a fifth one of said lens elements, surfaces No. 12 and No. 13 are the surfaces of a sixth one of said lens elements, and surface No. 14 indicates a focal plane, said lens elements being disposed consecutively along said optic axis, each of said lens elements being rotationally symmetric about said optic axis, each of said lens elements having a radius of curvature and a thickness (as tabulated above) measured along said optic axis, spacings between adjacent surfaces being measured along said optic axis, and where ADC1 and SBF1 are catalog designations uniquely specifying said first and second optical materials as optical glasses marketed by Hoya Corporation.

5. The optical objective of claim 1 wherein said first one of said two different optical materials has an index of refraction of approximately 1,620 and an Abbe number of approximately 62.19 at a base wavelength of 0.58756 micron, and said second one of said two different optical materials is selected from the group consisting of four materials whose indices of refraction and Abbe numbers for the same base wavelength are approximately as given in the following table:

| Index of Refraction | Abbe Number |
|---|---|
| 1.534 | 55.38 |
| 1.517 | 52.15 |
| 1.523 | 51.49 |
| 1.517 | 52.20 |

6. The optical objective of claim 5 wherein said first optical material is Hoya ADC1 glass, and said second optical material is selected from the group consisting of Hoya ZNC5 glass, Hoya CF6 glass, Schott KF9 glass and Schott KF6 glass, where ZNC5 and CF6 are catalog designations uniquely specifying two different optical glasses marketed by Hoya Corporation, and where KF9 and KF6 are catalog designations uniquely specifying two different optical glasses marketed by Schott Optical Glass Inc.

* * * * *